US012732249B2

(12) United States Patent
Rajendran

(10) Patent No.: US 12,732,249 B2
(45) Date of Patent: Sep. 8, 2026

(54) WIRELESS COMMUNICATION SYSTEMS FOR SELECTING ONE OR MORE ANTENNA PORTS FOR DOWNLINK TRANSMISSION

(71) Applicant: DISH Wireless L.L.C., Englewood, CO (US)

(72) Inventor: Karupaiah Rajendran, Highlands Ranch, CO (US)

(73) Assignee: DISH Wireless L.L.C., Englewood, CO (US)

( * ) Notice: Subject to any disclaimer, the term of this patent is extended or adjusted under 35 U.S.C. 154(b) by 215 days.

(21) Appl. No.: 18/210,389

(22) Filed: Jun. 15, 2023

(65) Prior Publication Data

US 2024/0421873 A1 Dec. 19, 2024

(51) Int. Cl.
*H04B 7/06* (2006.01)
*H04L 5/00* (2006.01)
*H04W 52/24* (2009.01)

(52) U.S. Cl.
CPC ......... *H04B 7/0626* (2013.01); *H04L 5/0051* (2013.01); *H04W 52/241* (2013.01)

(58) Field of Classification Search
CPC . H04B 7/0626; H04B 7/06952; H04L 5/0051; H04L 5/0048; H04W 52/241
See application file for complete search history.

(56) References Cited

U.S. PATENT DOCUMENTS

2022/0070764 A1* 3/2022 Taherzadeh Boroujeni ................ H04W 72/02
2022/0140878 A1* 5/2022 Zhu ...................... H04B 7/0626 370/252
2022/0225146 A1* 7/2022 Yoo ...................... H04B 17/318

FOREIGN PATENT DOCUMENTS

CN 114362906 A * 4/2022
WO WO-2021220472 A1 * 11/2021 ......... H04B 7/06968

OTHER PUBLICATIONS

Invitation to Pay Additional Fees and, Where Applicable, Protest Fee in International Appln. No. PCT/US2024/033897, mailed on Oct. 7, 2024, 11 pages.
International Search Report and Written Opinion in International Appln. No. PCT/US2024/033897, mailed on Nov. 28, 2024, 18 pages.

* cited by examiner

*Primary Examiner* — Hashim S Bhatti
*Assistant Examiner* — Noah James Sugden
(74) *Attorney, Agent, or Firm* — Lowenstein Sandler LLP

(57) ABSTRACT

A method for selecting one or more antennas disposed at a base station BS of a wireless communication system, where the method includes: transmitting, to one or more use equipment (UE), one or more initial synchronization signal blocks (SSB) and one or more initial channel state information-reference signals (CSI-RS) using a plurality of antenna ports, receiving, from the one or more UE, signals including at least one parameter indicative of corresponding operating conditions at the one or more UE in response to the transmitted one or more initial SSB and CSI-RS, selecting one or more antenna ports among the plurality of antenna ports based on the received at least one parameter, and performing downlink transmission using the selected one or more antenna ports.

14 Claims, 11 Drawing Sheets

Figure 5:
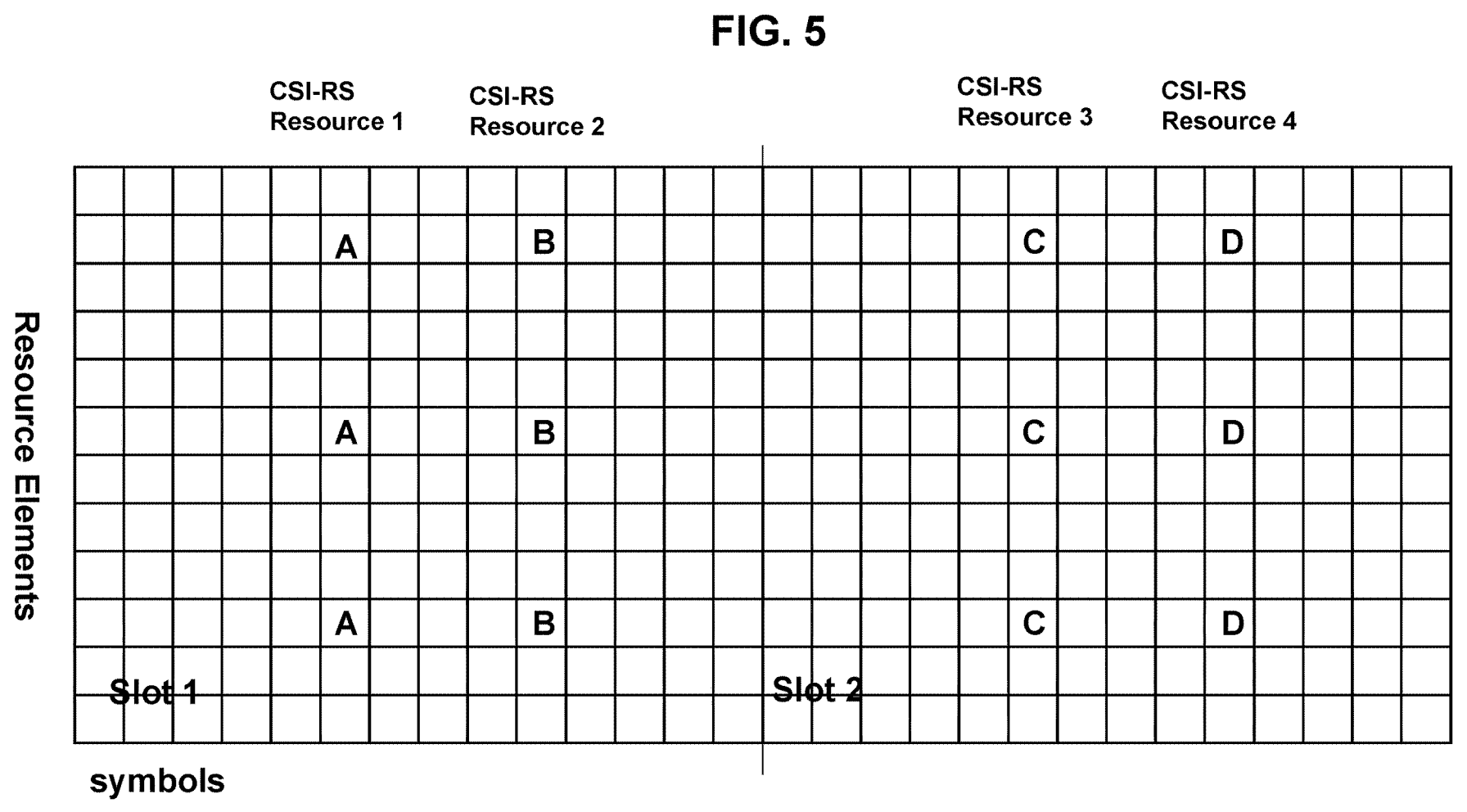

CSI-RS Resource 1
CSI-RS Resource 2
CSI-RS Resource 3
CSI-RS Resource 4

A B C D
A B C D
A B C D

Slot 1
Slot 2

Resource Elements symbols

WIRELESS COMMUNICATION SYSTEMS FOR SELECTING ONE OR MORE ANTENNA PORTS FOR DOWNLINK TRANSMISSION

TECHNICAL FIELD

The present disclosure relates to a wireless communication system, and more particularly, a method of dynamically selecting one or more antenna ports for downlink transmission by a base station (BS).

BACKGROUND

Wireless communication systems rely on antennas for the transmission and reception of signals. For example, a base station or access point employs multiple antennas for communication with one or more user devices or clients. These antennas are arranged in an array or a configuration, such as a sectorized antenna array or a multi-antenna array, to provide coverage over a specific area or sector.

SUMMARY

The present disclosure is directed to dynamically selecting one or more antennas for downlink transmission.

According to one aspect of the subject matter described in this application, a method for selecting one or more antennas disposed at a base station (BS) of a wireless communication system can include transmitting, to one or more user equipment (UE), one or more initial synchronization signal blocks (SSB) and one or more initial channel state information-reference signals (CSI-RS) using a plurality of antenna ports, receiving, from the one or more UE, signals including at least one parameter indicative of corresponding operating conditions at the one or more UE in response to the transmitted one or more initial SSB and CSI-RS, selecting one or more antenna ports among the plurality of antenna ports based on the received at least one parameter, and performing downlink transmission using the selected one or more antenna ports.

Implementations according to this aspect can include one or more of the following features. For example, the method can further include transmitting a demodulation reference signal (DMRS) to the one or more UE, where the at least one parameter includes a signal to interference and noise ratio (SINR) measurements generated based on the DMRS, and the one or more antenna ports are selected based on a comparison between the SINR and a predefined value.

In some examples, the DMRS can be accompanied by a tracking reference signal (TRS) including a sequence to allow the one or more UE to track time and frequency variations for channel estimation. In some implementations, the DMRS and the TRS can be transmitted on a same physical resource block.

In some examples, the method can further include adjusting transmission power of a SSB and a CSI-RS based on the SINR, and transmitting the SSB and the CSI-RS based on the adjusted SSB and CSI-RS transmission power using the selected one or more antenna ports. In some implementations, the at least one parameter can indicate that a logical connection between the UE and the BS is completed, and the one or more antenna ports can be selected based on a number of the one or more UEs logically connected to the BS.

In some examples, each of the one or more SSBs can be transmitted using a single antenna port, the at least one parameter can include a physical random access channel (PRACH) preamble indicating a best SSB for completing the logical connection, and the one or more antenna ports can be selected based on the PRACH preamble.

In some implementations, the at least one parameter can include a CSI-RS resource indicator (CRI) identifying a strongest CSI-RS, and the one or more antenna ports can be selected based on the CRI. In some examples, an antenna port that transmitted the strongest CSI-RS indicated by the CRI can be selected to perform the downlink transmission.

According to another aspect of the subject matter described in this application, a base station for selecting one or more antennas in a wireless communication system, the BS can include memory, at least one transceiver, and at least one processor coupled to the memory and the transceiver. The at least one processor can be configured to transmit, to one or more use equipment (UE), one or more initial synchronization signal blocks (SSB) and one or more initial channel state information-reference signals (CSI-RS) using a plurality of antenna ports, receive, from the one or more UE, signals including at least one parameter indicative of corresponding operating conditions at the one or more UE in response to the transmitted one or more initial SSB and CSI-RS, select one or more antenna ports among the plurality of antenna ports based on the received at least one parameter, and perform downlink transmission using the selected one or more antenna ports.

Implementations according to this aspect can include one or more of the following features. For example, the processor can be further configured to transmit a demodulation reference signal (DMRS) to the one or more UE, where the at least one parameter includes a signal to interference and noise ratio (SINR) measurements generated based on the DMRS, and the one or more antenna ports are selected based on a comparison between the SINR and a predefined value.

In some examples, the DMRS can be accompanied by a tracking reference signal (TRS) including a sequence to allow the one or more UE to track time and frequency variations for channel estimation. In some implementations, the DMRS and the TRS can be transmitted on a same physical resource block.

In some examples, the processor can be further configured to adjust transmission power of a SSB and a CSI-RS based on the SINR, and transmit the SSB and the CSI-RS based on the adjusted SSB and CSI-RS transmission power using the selected one or more antenna ports.

In some implementations, the at least one parameter can indicate that a logical connection between the UE and the BS is completed, and the one or more antenna ports can be selected based on a number of the one or more UEs logically connected to the BS. In some examples, each of the one or more SSBs can be transmitted using a single antenna port, the at least one parameter can include a physical random access channel (PRACH) preamble indicating a best SSB for completing the logical connection, and the one or more antenna ports can be selected based on the PRACH preamble.

In some implementations, the at least one parameter can include a CSI-RS resource indicator (CRI) identifying a strongest CSI-RS, and the one or more antenna ports can be selected based on the CRI. In some examples, an antenna port that transmitted the strongest CSI-RS indicated by the CRI can be selected to perform the downlink transmission.

BRIEF DESCRIPTION OF THE DRAWINGS

FIG. 5 is a diagram illustrating an example of a TRS resource across two slots.

DETAILED DESCRIPTION

In some wireless communication systems, the selection of antennas for downlink transmission is predetermined or statically configured. For example, a specific set of antennas is designated for transmitting signals to a user device, and this set of antennas remains unchanged regardless of the changing network conditions or user device locations. This static antenna selection approach may not be optimal in dynamically changing wireless environments where the quality of signal transmission may vary due to factors such as interference, fading, and mobility.

Thus, systems employing such static antenna selection approach may suffer from low system capacity, low data rates, and degraded user experience due to suboptimal antenna selection. For example, if an antenna with poor signal quality is selected for downlink transmission, it may result in reduced throughput or increased error rates, leading to reduced system performance. Moreover, by transmitting signals to an area where no user devices are located using an antenna, resources may not be utilized efficiently.

The technology described herein allows for dynamic selection of one or more antenna ports for downlink transmission in accordance with various operating conditions such as desired coverage, network capacity, quality of connections, etc. This in turn can improve network performance (e.g., by efficiently utilizing network resources) as compared to situations where the selection of antennas for downlink transmission is predetermined or statically configured.

Figure 1:
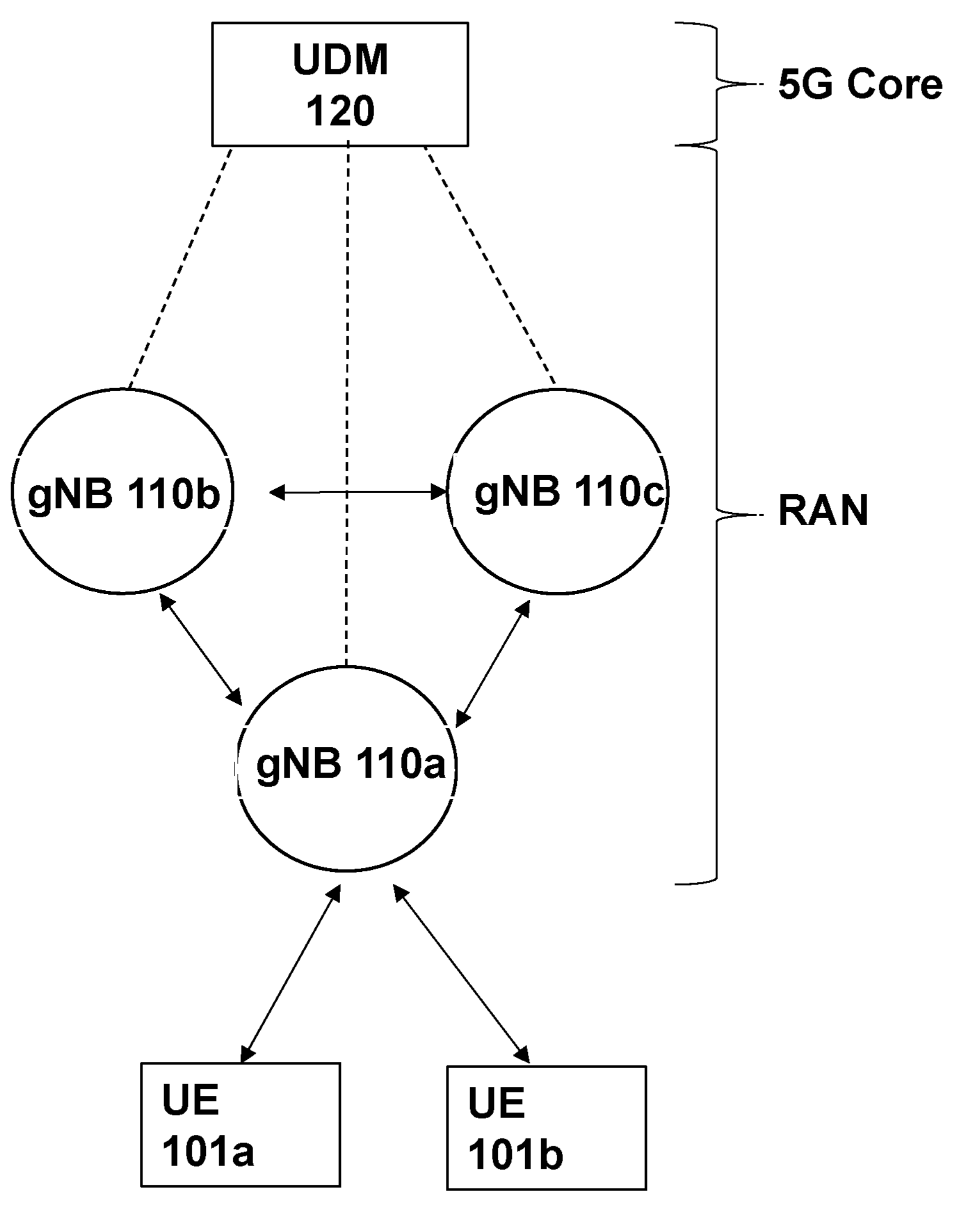
FIG. 1 is a diagram illustrating an example of a wireless communication system.

FIG. 1 is a diagram illustrating an example of a wireless communication system 100. Referring to FIG. 1, a wireless communication system 100 can include user equipment (UE) 101, a radio access network (RAN), and a core network (e.g., $5^{th}$ generation core network or Satellite Network).

The UE 101 can include a terminal, Mobile Equipment (ME), or Mobile Station (MS). The UE 101 can be a portable device such as a notebook computer, mobile phone, Personal Digital Assistant (PDA), smart phone, or a multimedia device, or a fixed device such as a Personal Computer (PC) or vehicle-mounted device. The UE 101 can include a communication module configured to transmit and receive a signal, a processor configured to control the communication module, and a memory configured to store information.

The RAN can include at least one RAN node. For example, the RAN node can serve as the interface between the user devices and the core network, facilitating the transmission and reception of data, voice, and other communication services over the air interface. The RAN node can perform various functions, including radio frequency (RF) signal transmission and reception, modulation and demodulation of signals, encryption and decryption of data, and management of radio resources. The RAN node can include at least one of gNodeBs (gNBs) 110 (e.g., a base station supporting 5G New Radio or Satellite). For example, the gNB can establish and maintain wireless communication with the UE 101 in a 5G network.

Each of the at least one of gNBs 110 can be a network node in charge of transmission/reception of wireless signals with the UE 101. The gNB can support functions for radio resource management (i.e., radio bearer control and radio admission control), connection mobility control, the dynamic allocation (i.e., scheduling) of resources to a UE in the uplink/downlink, Internet protocol (IP) header compression, the encryption and integrity protection of a user data stream, the selection of an AMF module upon attachment of a UE, user plane data routing to an UPF(s), and control plane information routing to an AMF module, connection setup and release. The gNB can further support the scheduling and transmission of a paging message (generated from an AMF module), the scheduling and transmission of system broadcast information, a measurement and measurement report configuration for mobility and scheduling, transport level packet marking in the uplink, session management, the support of network slicing, QoS flow management and mapping to a data radio bearer, the support of a UE that is an inactive mode, the distribution function of an NAS message, an NAS node selection function, radio access network sharing, and dual connectivity.

The core network can include a united data management (UDM) module 120. The core network can further include an access and mobility management function (AMF), a user plane function (UPF), and a session management function (SMF). The AMF can host the functions, such as non-access stratum (NAS) security, idle state mobility handling, etc. The AMF can be an entity including the functions of a conventional MME. The UPF can host the functions, such as mobility anchoring, protocol data unit (PDU) handling. The UPF can be an entity including the functions of the conventional S-GW. The SMF can host the functions, such as UE IP address allocation and PDU session control.

The UDM module 120 can be configured to manage data for access authorization, user registration, and data network profiles. Subscriber data can be provided to the SMF, which allocates IP addresses and manages user sessions on the network. In some implementations, the UDM module can send and store data. The AMF can receive user information sent through the network and forward the information to the SMF, which uses it to determine what session manager would be best assigned to the user. For example, the SMF can be a gateway from the user plane to the control plane of the network.

Figure 2:
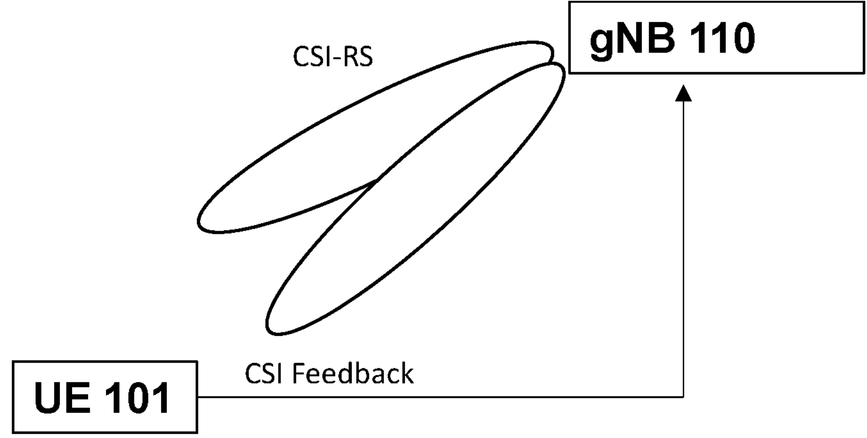
FIG. 2 is a diagram illustrating an example of CSI-RS transmission and feedback.

FIG. 2 is a diagram illustrating an example of channel state information reference signal (CSI-RS) transmission and feedback. A CSI-RS can be used in DL (Downlink) and UL (Uplink) channel estimation, beam management, time/frequency checking, RLM (Radio Link Monitoring) procedures, and interference measurements. For example, a CSI-RS is transmitted by the gNB 110 and received by the UE 101 to estimate the channel conditions. In DL channel estimation, the UE 101 utilizes the CSI-RS to estimate the DL channel quality, such as channel gains, channel phase, and channel characteristics. Similarly, in UL channel estimation, the gNB 110 receives CSI-RS feedback from the UE to estimate the UL channel quality. The accurate channel estimation provided by the CSI-RS can help optimize the transmission parameters, such as modulation and coding schemes, for improved communication performance and help select one or more antennas to perform DL transmission based on measurement from the UE 101 in response to the CSI-RS In some implementations, the CSI-RS is used for beam management procedures, including beamforming and beam tracking. For example, by transmitting the CSI-RS on different beams or beamforming configurations, the gNB 110 can assess the channel quality on each beam. The UE 101 measures the received CSI-RS and provides feedback to the gNB 110, allowing the gNB 110 to optimize beamforming parameters, beam selection, and handover decisions. This can facilitate efficient beam management, enabling better signal reception and enhanced system performance.

In some implementations, the CSI-RS can help in time and frequency synchronization and checking. For example, by decoding the PSS (Primary Synchronization Signal) and SSS (Secondary Synchronization Signal) carried by the CSI-RS, the UE 101 can synchronize with the gNB's time and frequency references. This synchronization allows the UE to align its transmissions or receptions accurately, ensuring reliable communication and minimizing interference.

In some implementations, the CSI-RS is employed in RLM procedures to monitor the quality of the radio link between the gNB 110 and the UE 101. For example, the UE 101 can measure the received CSI-RS and report the measurements to the gNB 110, providing information about the link quality. Based on these measurements, the gNB 110 can make decisions related to link adaptation, handover, and resource allocation to maintain a reliable and efficient radio link.

In some implementations, the CSI-RS is also used for interference measurements. For example, the UE 101 can measure the received CSI-RS from neighboring cells or interfering sources and provide feedback to the gNB 110. These interference measurements can help in interference management, resource allocation, and interference coordination techniques to mitigate the impact of interference and improve overall network performance.

The CSI-RS can be classified into two types: Non-Zero-Power CSI-RS and Zero-Power CSI-RS (ZP-CSI-RS). These types of CSI-RS may serve different purposes and may be used for specific functionalities in the system.

For example, a Non-Zero-Power CSI-RS is a reference signal that is transmitted with non-zero power that can be used for channel estimation and feedback purposes, enabling the UE to estimate the channel conditions accurately and provide feedback to the gNB. In some implementations, the Non-Zero-Power CSI-RS can be transmitted by the gNB with a certain power level. The UE receives the Non-Zero-Power CSI-RS and utilizes it to estimate the channel quality and other parameters. The UE can then provide feedback to the gNB, reporting the channel measurements, quality indicators, and other information derived from the Non-Zero-Power CSI-RS. This feedback can help the gNB to optimize various aspects of the communication, such as beamforming, resource allocation, and scheduling.

Further, the Zero-Power CSI-RS (ZP-CSI-RS) is a reference signal that is transmitted with zero power, which is used for specific purposes such as synchronization, time and frequency tracking, and interference measurements. In some implementations, the ZP-CSI-RS can be transmitted by the gNB without any power allocation and provides a reference signal that allows the UE to perform various synchronization and tracking functions. The UE can decode the ZP-CSI-RS to synchronize with the gNB's time and frequency references accurately to help in aligning transmissions or receptions, maintaining proper time and frequency synchronization, and ensuring reliable communication.

In addition, the ZP-CSI-RS can be utilized by the UE for interference measurements. The UE can measure the received ZP-CSI-RS from neighboring cells or interfering sources and provide feedback to the gNB regarding the interference levels. These measurements can assist the gNB 110 in interference management, resource allocation, and interference coordination techniques for optimizing network performance.

In some implementations, the bandwidth allocated to the CSI-RS can be greater than or equal to 24 resource blocks, unless the bandwidth part occupies less than 24 resource blocks in which case the bandwidth is set to be equal to a number of resource blocks within the bandwidth part.

The CSI-RS can be configured with various parameters that define its characteristics and usage. For example, the CSI-RS can be configured with a number of CSI-RS ports that refers to the number of independent CSI-RS resources transmitted by the gNB. Each CSI-RS port corresponds to a distinct antenna port or transmit/receive chain. The number of CSI-RS ports determines the spatial multiplexing capabilities of the system and impacts beamforming and MIMO (Multiple-Input Multiple-Output) transmission.

In some implementations, the CSI-RS can be configured with CSI-RS density that refers to the spatial distribution of CSI-RS resources within a cell. It determines the number of CSI-RS resources per resource block or per frequency-time resource. Higher CSI-RS density provides more granular channel measurement and enables accurate channel estimation and feedback.

In some implementations, the CSI-RS can be configured with a code division multiplexing (CDM) type that refers to the specific code division multiplexing scheme used for transmitting CSI-RS. It determines how the CSI-RS resources are multiplexed with other signals in the frequency domain. Different CDM types, such as orthogonal, non-orthogonal, or pseudo-random sequences, can be employed to separate CSI-RS from other signals, ensuring accurate channel estimation.

In some implementations, the CSI-RS can be configured with a CSI-RS pattern that defines the pattern or configuration of CSI-RS resources within a cell. It determines the locations and arrangement of CSI-RS resources in terms of time-frequency resources. The CSI-RS pattern can be configured based on various factors, including system design, cell layout, and coverage requirements. Different CSI-RS patterns can allow for flexible deployment and optimization of the channel estimation process.

In some implementations, the CSI-RS can be configured with symbols in same slot that indicates the specific symbols within a slot that carry the CSI-RS. In a time-domain perspective, the CSI-RS symbols are located within a transmission slot, which is a fixed time interval. The position of CSI-RS symbols within the slot is predetermined and known to the receiver. These symbols are used for channel estimation and demodulation purposes.

In some implementations, the gNB can configure a UE with one or more Non-Zero-Power CSI-RS resource sets, each resource set including one or more CSI-RS resources. In some implementations, a single resource set is configured when periodic or semi persistent triggering is used. Density indicated in the CSI-RS quantifies a number of resource elements allocated to the CSI-RS per resource block per port. For example, a density of 0.5 may indicate that every second resource block includes one resource element allocated to the CSI-RS per port.

Antenna port mapping can determine how CSI-RS resources are distributed across different antenna ports in the network. For example, each antenna port corresponds to an independent transmit/receive chain or physical antenna element. The number of antenna ports represents the number of these independent transmission or reception points available in the gNB 110. The selection of the number of antenna ports depends on factors such as the number of physical antennas, MIMO configurations, and beamforming capabilities.

The CSI-RS occupying resource elements may refer to the allocation of CSI-RS symbols within the resource grid. The resource grid is a time-frequency grid that defines the available resource elements for transmission and reception in the system. CSI-RS symbols are specifically allocated within this resource grid for channel estimation and measurement purposes In some implementations, the CSI-RS occupying resource elements are distributed across these ports. Each antenna port is associated with a subset of CSI-RS symbols within the resource grid. The distribution of CSI-RS symbols across antenna ports allows for the implementation of MIMO transmission or reception, beamforming, and spatial multiplexing techniques.

The specific mapping between the antenna ports and CSI-RS symbols can be defined by signaling and configuration parameters exchanged between the gNB and the UE during the RRC procedures described above. The configuration can include information about the number of antenna ports, the mapping scheme, and the allocation of CSI-RS symbols within the resource grid.

The UE 101 can make various measurements and report the measurements to the gNB 110. In some implementations, the measurements are made based on the SSB and CSI-RS.

The UE 101 can report Channel State Information (CSI) to the gNB 110 using either a PUSCH or a PUCCH. The gNB can use the CSI to support its downlink transmission on the PDSCH and PDCCH. In some implementations, the CSI can include a channel quality indicator (CQI), CSI-RS resource indicator (CRI), a rank indicator (RI), and a precoding matrix indicator (PMI).

The gNB can use this information for selecting UE to receive resource allocations. In some implementations, the CSI can be used when selecting an appropriate CCE aggregation level. For example, a UE in poor coverage area can be allocated with higher aggregation levels.

The CSI reporting relies upon UE completing downlink measurements and subsequently providing feedback to the gNB. These measurements are based upon CSI-RS resources. The CSI-RS resources can use (i) an information element regarding the resources for CM to specify a NZP CSI-RS for measuring the propagation channel based upon a "wanted" signal and (ii) an information element regarding the NZP CSI-RS IM to specify CSI-RS resource which the serving cell uses for transmission towards other UE (typically using different downlink beams). These resources allow the UE to measure the interference experienced when using Multi-User MIMO (MU-MIMO), such as multiple spatially separated UEs sharing the same downlink RBs.

The gNB can configure the CSI-RS to allow the CSI measurements to use a periodic, semi-persistent, or aperiodic triggering mechanism. In some implementations, the CSI-RS transmissions which are used to derive the CSI measurements can also be periodic, semi-persistent, or aperiodic. For example, an aperiodic CSI report can be generated using a periodic CSI-RS transmission.

The UE can generate CSI-RS resource indicator (CRI) to report the quality and characteristics of the received CSI-RS to the gNB. For example, the CRI can provide information for the gNB to optimize network's performance and make informed decisions regarding resource allocation, beamforming, and other transmission parameters. By way of further example, the CSI-RS resource indicator includes details about the received CSI-RS, such as the signal quality, interference levels, and channel characteristics, which allows the UE to report feedback to the gNB, enabling the network to assess the channel conditions accurately and adjust its transmission accordingly.

In some implementations, the UE can measure the received CSI-RS and gather information about the signal quality, interference, and channel conditions. These measurements can include parameters like signal-to-noise ratio (SINR), received power, channel gains, and interference levels.

In some implementations, the UE can, based on the measurements, calculate the CRI value. The calculation may involve aggregating the measurement results and deriving a concise representation of the received CSI-RS quality and characteristics.

In some implementations, the UE includes the calculated CRI value in the feedback or reporting messages sent to the gNB. Upon receiving the CRI from the UE, the gNB can process the reported information. For example, the gNB can utilize the resource indicator to assess the channel conditions, interference levels, and other relevant parameters. Further, the gNB can adjust its transmission parameters, beamforming configurations, resource allocation, or other optimization strategies based on this feedback.

The UE can generate CQI values related to downlink radio channel conditions within a specific bandwidth part and report the CQI values in the CSI report to the gNB. The gNB can use the CQI values to select a UE for resource allocation. For example, a UE reporting high CQI values relative to its average CQI values is more likely to be selected for resource allocation.

In some implementations, the CQI values can indicate how much data can be packed into each resource element. For example, the UE can inform, through the uplink control region, the gNB a number of bits the gNB can include in each resource element, where the remaining bits will be used for error correction information. The bits for error correction information can be replaced for correcting any detected errors. The number of bits that the gNB can include in each resource element can refer to a number of bits that the UE could read.

The UE can also report synchronization signal-signal to interference and noise ratio (SS-SINR) measurement to the gNB. The SS-SINR can represent the ratio of the wanted signal power to the interference plus noise power, where both the wanted signal power and the interference plus noise power are measured from resource elements used by the SSS. For example, the UE can inform the gNB through the SS-SINR measurement that the UE received data at a certain level, the intensity of the data, and whether the UE was able to read the data or not.

The UE can also report CSI-SINR measurement to the gNB. The CSI-SINR can represent the ratio of the wanted signal power to the interference plus noise power, where both the wanted signal power and the interference plus noise power are measured from resource elements used by the CSI-RS. For example, the UE can inform the gNB through the CSI-SINR measurement that the UE received data at a certain level, the intensity of the data, and whether the UE was able to read the data or not.

The UE can measure received signal strength indicator (RSSI) at resource blocks. For example, the RSSI can be measured from resource blocks occupied by the SSS. In some implementations, the UE can report the RSSI to the gNB.

The gNB can use power headroom (PHR) reports from the UE to identify the number of resource blocks to be allocated to the PUSCH. In some implementations, the gNB may restrict the number of allocated resource blocks if the UE is reporting a low power headroom. In some implementations, the gNB can use the PHR reports to calculate the path loss toward the UE, where these path loss results can then be used to enable or disable specific functionality. The PHR reports can include PHR values occupying a set of 6 bits providing range from 0 to 63.

Figure 3:
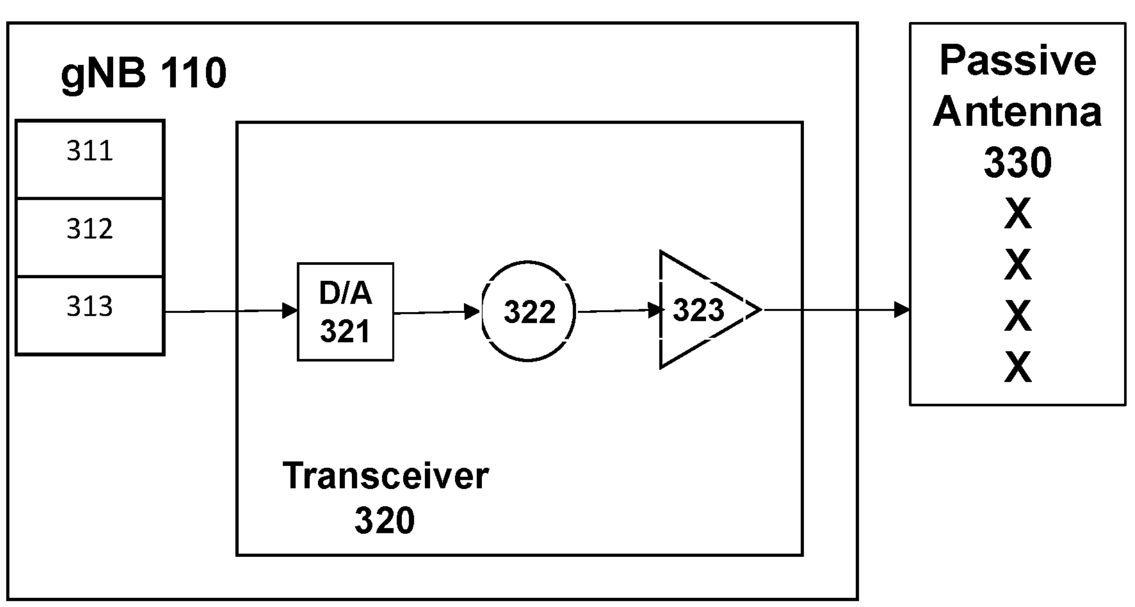
FIG. 3 is a diagram illustrating an example of a passive antenna architecture.

FIG. 3 is a diagram illustrating an example of passive antenna architecture 300. Referring to FIG. 3, the gNB 110 can include a distributed unit (DU) connected to a passive antenna 330.

The DU can support a radio link control (RLC) layer 311, a medium access control (MAC) layer 312, and a physical layer 313. The RLC layer 311 can communicate with the UE and can be used to transfer user plane data and control plane signaling. The MAC layer 312 can communicate with the UE and can be responsible for prioritizing and multiplexing logical channel data received from the RLC layer 311. In some implementations, the MAC layer 312 can generate transport blocks from the logical channel data and pass them down to the physical layer 313. The physical layer 313 can provide physical layer processing as well as transmission and reception across the air-interface. In some implementations, the physical layer 313 can transmit a digital baseband signal to the transceiver 320.

The transceiver 320 can include a Digital to Analogue (D/A) converter 321 configured to convert the digital baseband signal received from the physical layer 313 to an analogue signal, a local oscillator 322 configured to mix the signal from baseband to radio frequency (RF), and a power amplifier 323. In some implementations, the analogue RF signal can be transmitted toward the passive antenna 330 using a RF feeder cable.

The passive antenna 330 can be configured to transmit and receive electromagnetic waves without any signal amplification or processing. The passive antenna 330 can include antenna elements X where the specific configuration and arrangement of antenna elements determine the radiation pattern, gain, and other characteristics of the antenna.

Figure 4:
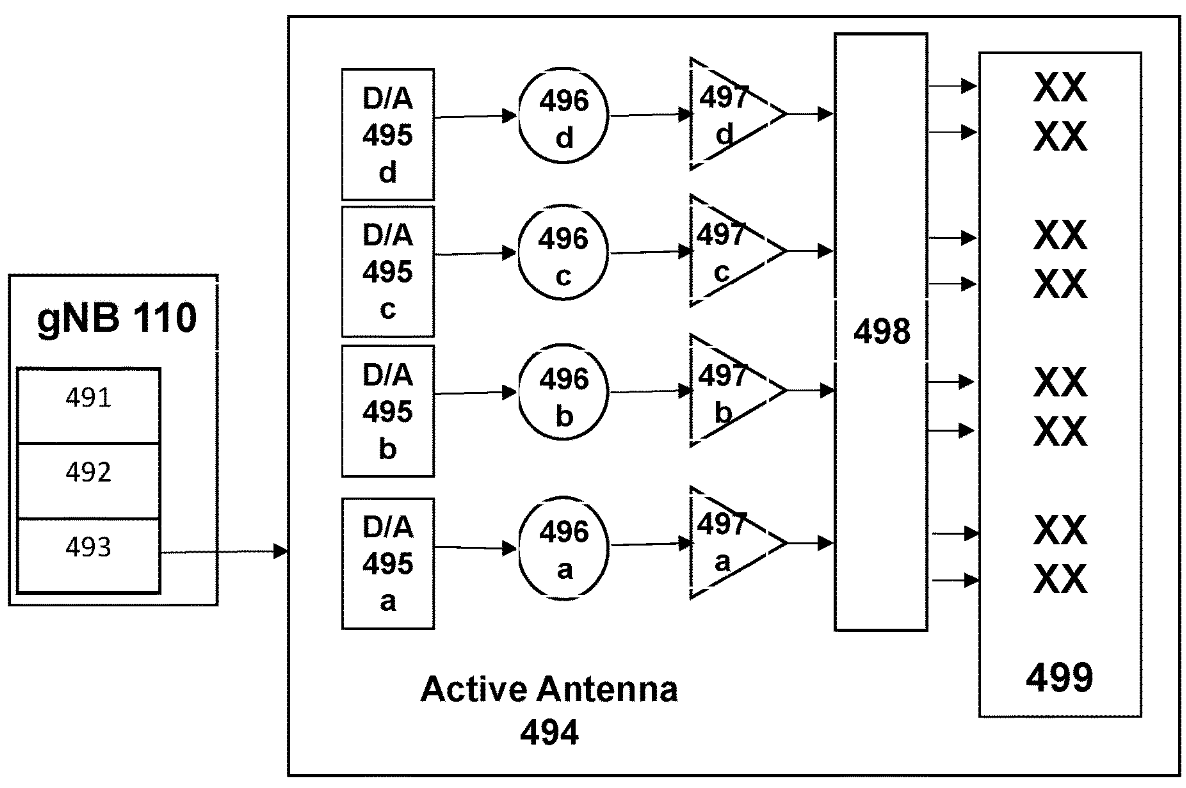
FIG. 4 is a diagram illustrating an example of an active antenna architecture.

FIG. 4 is a diagram illustrating an example of active antenna architecture 490. In the active antenna, the transceiver functionality is moved from the gNB into the antenna. In some examples, an active antenna may have a larger number of lower power transceivers relative to a gNB connected to a passive antenna. Increasing the number of transceivers increases the cost, weight and power consumption of the antenna but also increases the beamforming capability which can translate into improved coverage and increased capacity.

Referring to FIG. 4, the gNB 110 can include a distributed unit (DU) connected to an active antenna 494. The DU can support a radio link control (RLC) layer 491, a medium access control (MAC) layer 492, and a physical layer 493. The RLC layer 491, the MAC layer 492, and the physical layer 493 can perform analogous operations as the RLC layer 311, the MAC layer 312, and the physical layer 313 described above with respect to FIG. 3. Therefore, the description may be omitted.

The active antenna 494 can include one or more transceivers, a radio distribution network 498, and one or more antenna elements 499 (depicted as X in FIG. 4). The antenna elements 499 can transmit and receive electromagnetic waves. The antenna elements 499 in the active antenna 494 can take various forms, depending on the design and application.

Each of the one or more transceivers can include a Digital to Analogue (D/A) converter 495 configured to convert the digital baseband signal received from the physical layer 493 to an analogue signal, a local oscillator 496 configured to mix the signal from baseband to radio frequency (RF), and a power amplifier 497.

In some implementations, the active antenna 494 can support physical layer processing. For example, some parts of the baseband processing can be moved from the gNB to the active antenna 494. This could include the application of the beamforming weights when using digital beamforming.

In some implementations, the active antenna 494 can have more antenna elements (depicted as X in FIG. 4) than it has transceivers. For example, each transceiver can be connected to multiple antenna elements. By way of further example, as depicted in FIG. 4, the active antenna has four transceivers and 2 columns of cross polar antenna elements X where each transceiver can be connected to a single column of antenna elements X to provide basic horizon beamforming.

In some implementations, combined horizontal and vertical beamforming can be achieved if each column of antenna elements is divided in subsets and a transceiver is allocated to each subset.

When CSI-RS are transmitted for beam selection refinement, the CSI-RS can be precoded to generate directional beams. The UE may be responsible for identifying the best directional beam and providing feedback to the gNB using a CSI-RS resource indicator (CRI).

In some implementations, antenna elements can be used for beamforming, Multiple-Input Multiple-Output (MIMO) or a combination of both beamforming and MIMO. Using MIMO in combination with beamforming can reduce the number of antenna elements available for beamforming.

MIMO is a technology used in 5G networks to enhance data transmission and improve network performance. It allows multiple antennas to be used at both the transmitter and receiver sides of a communication system, enabling simultaneous transmission and reception of multiple data streams.

In a MIMO system, the available frequency spectrum is divided into multiple subchannels. Each subchannel is associated with a different antenna at the transmitter and receiver. By utilizing spatial multiplexing techniques, MIMO can transmit multiple data streams simultaneously over the same frequency band, thereby increasing the overall capacity and spectral efficiency of the network.

In some implementations, the PDSCH physical channel and its demodulation reference signal (DMRS) can share the same antenna port. This may allow the UE to deduce the propagation channel from the DMRS and use that information to help decode the information content from the PDSCH.

In some implementations, MIMO is able to transmit multiple parallel streams of data using the same time and frequency resources. For example, this may be possible by transmitting each stream on a different antenna port to ensure that each stream experiences a different propagation channel. The receiver is then able to differentiate each stream and complete decoding.

In a 5G network, reference signals can be used in various aspects of communication, including DL (Downlink) channel state information estimation, data channel demodulation, control channel demodulation, time and frequency tracking, beam management, radio link monitoring, and RRM (Radio Resource Management) measurement.

For example, for DL Channel State Information (CSI) Estimation, a CSI-RS is transmitted by the gNB 110 and received by the user equipment (UE) 101, as described above with respect to FIG. 2. The CSI-RS can carry information about the channel conditions between the gNB and the UE. In some implementations, the CSI-RS can be used for estimating and reporting channel quality indicators (CQI), precoding matrices, and other parameters necessary for adaptive modulation and coding schemes. This information can help optimize the transmission parameters based on the current channel conditions.

In some implementations, for data channel demodulation, a DMRS is embedded within the data symbols to aid in demodulating the transmitted data. For example, a DMRS provides a known reference signal that enables the receiver to estimate the channel conditions and separate the desired data from interference and noise.

In some implementations, for control channel demodulation, a tracking reference signal (TRS) is used to track and estimate the channel conditions in control channels. For example, a TRS aids in the demodulation and decoding of control information transmitted on the control channels, ensuring accurate reception of control signaling.

In some implementations, for time and frequency tracking, an SSB carries primary synchronization signals (PSS) and secondary synchronization signals (SSS) that assist in time and frequency synchronization. For example, by detecting and decoding the PSS and SSS within the SSB, the UE can synchronize with the gNB's time and frequency references, enabling coherent reception of subsequent data and control signals.

In some implementations, for beam management, reference signals such as CSI-RS and DMRS are employed for radio link monitoring to assess the link quality between the UE and the gNB continuously. For example, based on the received reference signal measurements, the network can perform link adaptation, handover decisions, and other radio resource management operations.

In some implementations, a CSI-RS and a DMRS are used for Radio Resource Management (RRM) measurements. For example, these reference signals provide the necessary information to measure signal strength, signal quality, interference levels, and other parameters needed for efficient resource allocation, interference management, and link optimization.

FIG. 5 is a diagram illustrating an example of a TRS resource across two slots. For example, as depicted in FIG. 5, the TRS is configured as a Non-Zero Power (NZP) CSI-RS resource set, which includes 4 CSI-RS resources (each CSI-RS resource depicted as A, B, C, and D) across 2 consecutive slots (slots 1 and 2), with 2 resources within each slot. Each CSI-RS resource within the resource set may use a single port with a density of 3 resource elements per resource block, where the relatively high density helps to improve the UE's ability to track time and frequency offsets. For example, as depicted in FIG. 5 where x-axis refers to symbols and y-axis refers to resource elements, each CSI-RS resource has a density of 3 resource elements per physical resource block per port and CSI-RS resources within the same slot are separated by 4 symbols. By way of further example, the CSI-RS resource set including 4 CSI-RS resources can be transmitted by one antenna port. A resource element (RE) and a physical resource block (PRB) are fundamental units of time and frequency resources used in the wireless communication system. For example, a RE may refer to the smallest unit of resource allocation in the time and frequency domain and correspond to the intersection of one subcarrier in the frequency domain and one symbol period in the time domain. Each RE can carry a discrete amount of information or control signals. By way of further example, a physical resource block may be a collection of resource elements and may represent a two-dimensional resource allocation unit in both the time and frequency domains. A PRB may consist of several consecutive subcarriers and a specific number of consecutive symbols.

As described above, the TRS is a reference signal used for tracking and estimating channel conditions in control channels. In some implementations, TRS resource mapping refers to the process of allocating and mapping TRS resources within the available frequency and time resources in a 5G system.

In some implementations, the TRS resource mapping involves determining the specific locations within the frequency-time grid where TRS signals will be transmitted. This mapping can ensure that TRS signals are effectively transmitted and received by the UE for accurate channel tracking and demodulation of control channels.

Figure 6:
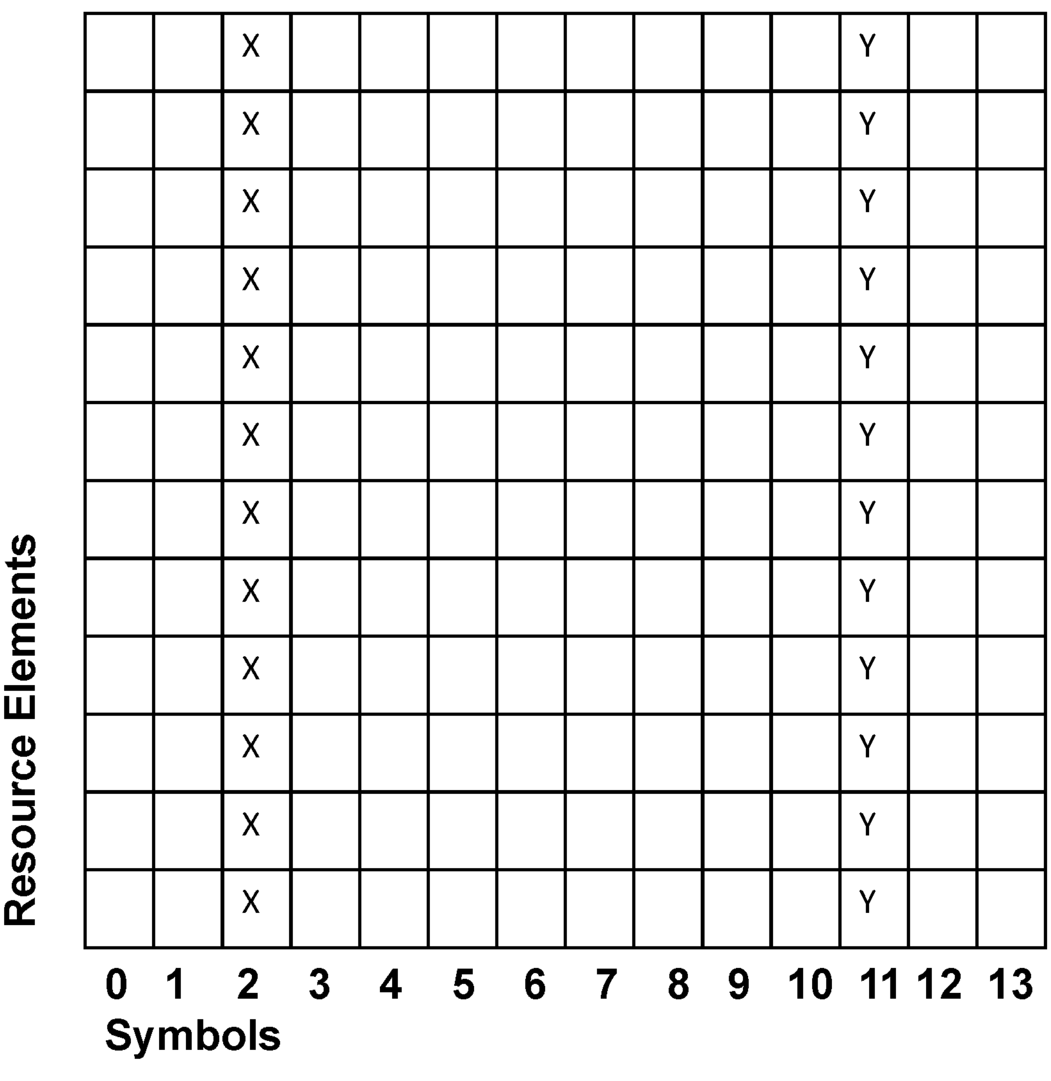
FIG. 6 is a diagram illustrating an example of configuration of a demodulation reference signal (DMRS).

FIG. 6 is a diagram illustrating an example of configuration of a DMRS where front-loaded DMRS (depicted as X) are configured at symbol 2 and additional DMRS (depicted as Y) are configured at symbol 11. In some implementations, front-loaded DMRS and additional DMRS can be used to enhance the performance of the communication system.

For example, front-loaded DMRS X refers to the placement of DMRS symbols at the front or beginning of the data transmission block, such that the DMRS symbols are placed before the data symbols within a transmission slot or time interval. The front-loaded DMRS X can offer the advantage of having DMRS symbols available early in the reception, allowing for earlier channel estimation and demodulation. This early availability of reference symbols can improve the receiver's ability to accurately estimate the channel conditions and mitigate any fading or interference that might be present. In some implementations, the front-loaded DMRS can be configured at symbol 3.

In some implementations, an additional DMRS Y involves the transmission of extra DMRS symbols alongside the regular DMRS symbols. These additional DMRS symbols Y can provide additional reference signals for more accurate channel estimation and demodulation. For example, the usage of additional DMRS can (i) improve robustness by increasing the number of reference symbols, where the additional DMRS provides redundancy and helps combat adverse channel conditions, interference, or fading, (ii) provide higher reliability because the additional DMRS enhances the receiver's ability to estimate the channel accurately, resulting in more reliable demodulation and decoding of data symbols, and (iii) increase system capacity because the use of additional DMRS allows for more efficient allocation of resources and helps in achieving higher data rates or supporting more users within a given bandwidth.

In some implementations, the PDSCH is transmitted in combination with the DMRS. For example, the DMRS and PDSCH are transmitted using the same precoding and the same antenna ports. By way of further example, they both experience the same composite propagation channel. The UE has knowledge of the sequence transmitted by the DMRS so can deduce the composite propagation channel by comparing the received DMRS with the transmitted DMRS.

In some implementations, the DMRS is transmitted within the set of RB allocated to the PDSCH. For example, if a UE is allocated 10 RBs for the PDSCH, then both the DMRS and the PDSCH will be transmitted across those 10 RBs. In some implementations, the DMRS can be transmitted on the same antenna ports as the PDSCH.

In some implementations, the DMRS for the PDSCH has been specified to be flexible and to support a wide range of configurations. These configurations may account for the requirements associated with MIMO.

In some implementations, a PDSCH DMRS can have two types of configurations, configuration type 1 supporting up to 8 ports and OFDM based patterns and configuration type 2 supporting up to 12 ports and frequency domain orthogonal cover codes (FD OCC) based patterns.

In some implementations, a PDSCH DMRS can have two types of mapping, Type A is for downlink slot based transmission configured by master information block (MIB) and Type B is for downlink non-slot based transmission. In some implementations, a first DMRS position corresponds to a first symbol of PDSCH and front-loaded DMRS position can be configured by the MIB. Further, for the Type B, a front-loaded DMRS can be positioned in the first OFDM symbol of data allocation.

In some implementations, selection of DMRS Type A or B, and its corresponding configuration parameters, is determined through radio resource control (RRC) procedures. The specific RRC procedures involved may vary depending on the use case and the network configuration.

For example, in the RRC connection setup and RRC Reconfiguration procedures, the gNB provides the DMRS configuration information to the UE. The signaling messages exchanged during these procedures include parameters related to DMRS type, DMRS configuration mode, DMRS resource mapping type, and other related parameters.

The selection of DMRS Type A or B may depend on various factors such as system load, channel conditions, and available resources. The gNB can determine the appropriate DMRS configuration based on the specific deployment and optimization goals.

Figure 7:
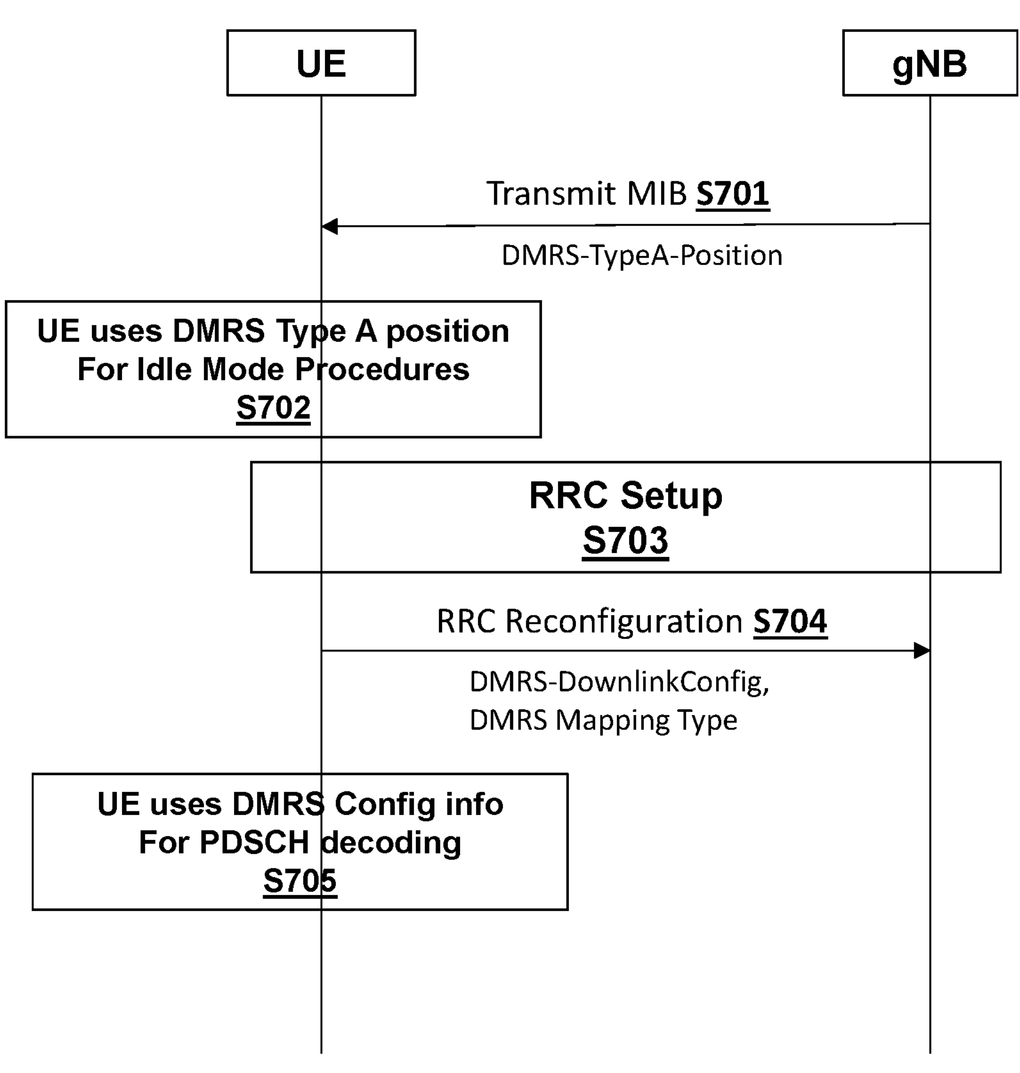
FIG. 7 is a diagram illustrating an example of a radio resource control (RRC) procedure using the DMRS.

For example, as depicted in FIG. 7, a gNB 110 can transmit a MIB indicating a DMRS Type A and a corresponding position to a UE (S701). In response to the received MIB, the UE 101 can use the DMRS Type A and the corresponding position for idle mode procedures (S702). The UE 101 can further perform a RRC setup procedure based on the DMRS Type A (S703). The gNB can further transmit information including parameters related to DMRS type, DMRS configuration mode, DMRS resource mapping type, and other related parameters (S704), and the UE can use the information for PDSCH decoding (S705).

Figure 8:
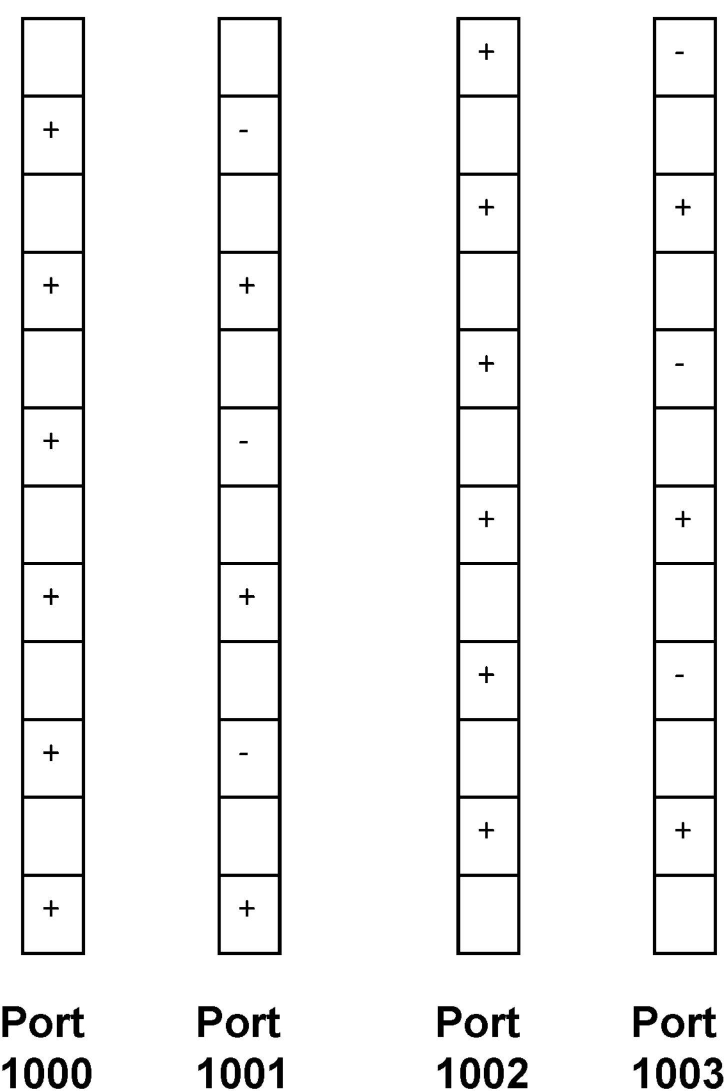
FIG. 8 is a diagram illustrating an example of physical downlink shared channel (PDSCH) demodulation reference signals (DMRS) configuration type 1.

FIG. 8 is a diagram illustrating PDSCH DMRS configuration type 1 allocating every second resource element to the DMRS. In some implementations, the configuration type 1 can allow the antenna ports to be frequency multiplexed. For example, antenna ports 1000 and 1001 can be frequency multiplexed with antenna ports 1002 and 1003, where antenna ports sharing the same resource elements are differentiated using an orthogonal cover code (OCC) which allows code division multiplexing (CDM).

As depicted in FIG. 8, single symbol transmission with the configuration type 1 can support 4 antenna ports (1000, 1001, 1002, and 1003) to support up to 4×4 MIMO. In some implementations, a UE receiving 4 layers of data (rank 4) with single user MIMO can be allocated to antenna ports 1000 to 1003 that can fully occupy the DMRS symbol and there are no resources available for the PDSCH. In addition, a UE receiving a single layer of data (rank 1) with the single user MIMO can be allocated to antenna port 1000, which can occupy only half of the resource elements within the DMRS symbol. In some implementations, a UE receiving 2 layers of data (rank 2) with single user MIMO can be allocated to antenna ports 1000 and 1001 (i.e., code division multiplexing is prioritized over frequency multiplexing, where these two antenna ports can occupy only half of the resource elements within the DMRS symbol.

Figure 9:
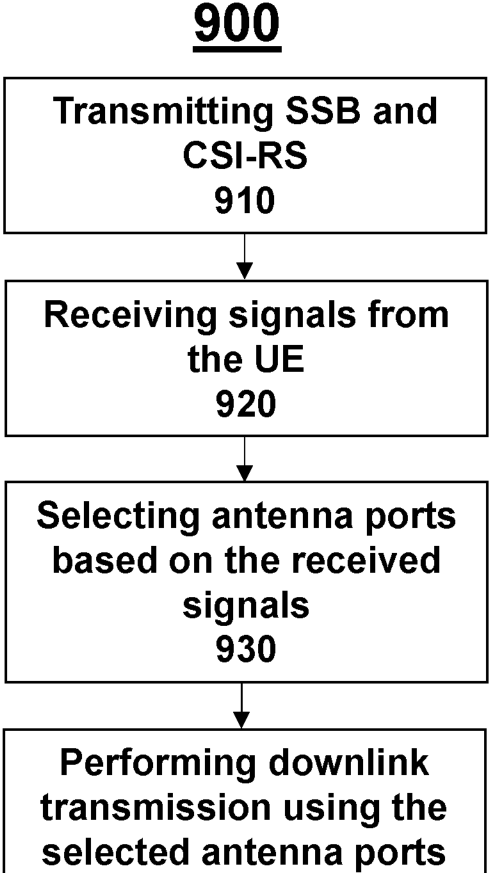
FIG. 9 is a flowchart showing an antenna selection procedure.

FIG. 9 is a flowchart illustrating an example process 900 for antenna port selection performed by gNB 110.

In step 910, the gNB 110 can configure the SSB and the CSI-RS in the resource blocks and transmit the configured resource blocks to one or more UE 101 for the UE 101 to decode the SSB and the CSI-RS.

In step 920, the gNB 110 can receive signals from one or more UEs, where the signals include at least one parameter indicative of corresponding operating conditions at the one or more UEs. For example, the signals can be feedback from the one or more UEs on the transmitted SSB and CSI-RS.

The at least one parameter indicative of corresponding operating conditions at the one or more UEs can include a CRI value identifying a strongest CSI-RS. The at least one parameter indicative of corresponding operating conditions can further include a physical random access channel (PRACH) preamble indicating a best SSB for completing the logical connection. In some implementations, the at least one parameter can include various measurements from the UE described above. For example, the at least one parameter can include a SS-SINR or a CSI-SINR described above.

In some implementations, the at least one parameter can include a PHR value in power headroom (PHR) reports identifying the number of resource blocks to be allocated to the PUSCH, which is described above. For example, the UE can inform the gNB through the PHR report that the UE does not have sufficient power to reach any further distance.

In some implementations, the at least one parameter can include acknowledgement and negative acknowledgement information. For example, acknowledgement information can indicate that data the UE received from the gNB did not have any errors. By way of further example, negative acknowledgement information can indicate that the data was received with errors or was otherwise unreadable.

In step 930, the gNB can select one or more antenna ports, among a plurality of antenna ports implemented in the gNB, based on the at least one parameter received from the one or more UEs in step 920. For example, the gNB can select one or more antenna ports based on a number of one or more UEs logically connected to the gNB. By way of further example, the gNB can select an antenna port to which a most number of UEs are connected.

In some implementations, the gNB can select one or more antenna ports based on the PRACH preamble, which indicates a best SSB for completing the logical connection. In some implementations, the gNB can select one or more antenna ports based on the CRI identifying a strongest CSI-RS among one or more CSI-RS transmitted to the one or more UEs. For example, an antenna port that transmitted the strongest CSI-RS indicated by the CRI is selected to perform the downlink transmission. In some implementations, the gNB can select one or more antenna ports based on various measurements from the UE, which is described above.

In some implementations, one or more antenna ports can be selected based on the at least one parameter received in response to a DMRS. The DMRS is a reference signal used for demodulation and channel estimation at the receiver (UE) in the downlink direction. The DMRS configuration can define how the DMRS symbols are mapped to the antenna ports in the system. By configuring the antenna port based on the DMRS, the network can ensure accurate demodulation and channel estimation, enabling efficient MIMO transmission, beamforming, and other advanced techniques considering serving DU Hardware and Software capabilities including the other interacting features enabled in the network for an instance PDSCH DMRS and Traffic Resource Rate Matching capability.

In step 940, the gNB can perform downlink transmission using the one or more antenna ports selected in step 930.

Figure 10:
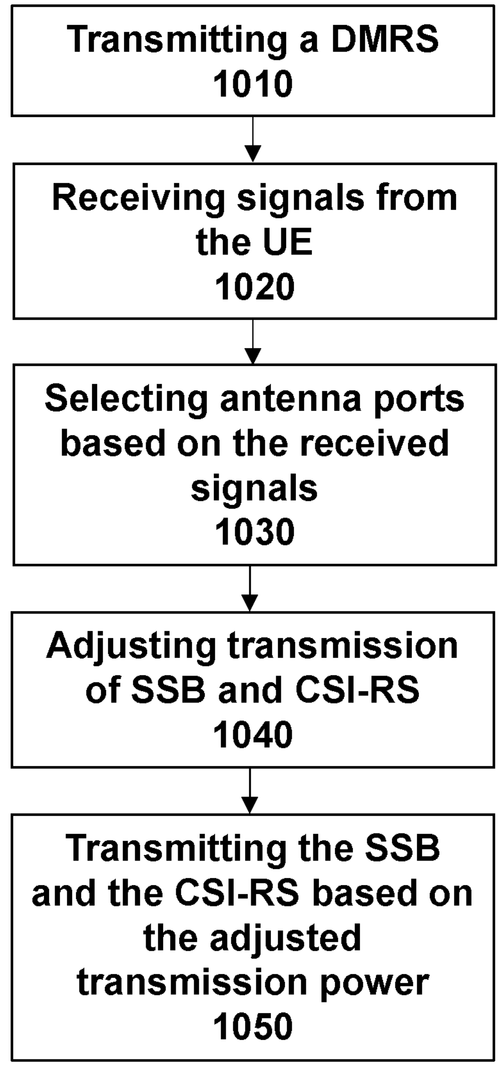
FIG. 10 is a flowchart showing an antenna selection procedure using the DMRS.

FIG. 10 is a flowchart illustrating an example process 1000 of antenna port selection performed by gNB 110 based on at least one parameter received in response to a DMRS.

In step 1010, the gNB can transmit a DMRS, which is described above, to the one or more UEs. In some implementations, the DMRS is accompanied by a tracking reference signal (TRS) including a sequence to allow the one or more UE to track time and frequency variations for channel estimation. For example, the DMRS and the TRS are transmitted on a same physical resource block.

In step 1020, the gNB can receive signals from one or more UEs, where the signals include at least one parameter indicative of corresponding operating conditions at the one or more UEs. For example, the signals can be feedback from the one or more UEs on the transmitted DMRS.

In some implementations, the at least one parameter includes a signal to interference and noise ratio (SINR) measurements generated based on the DMRS.

In step 1030, the gNB can select based on a comparison between the SINR and a predefined value. For example, the gNB may select one or more antenna ports associated with transmitted CSI-RS that resulted in the SINR being greater than a predefined value as indicated from UE measurements.

In step 1040, the gNB can adjust transmission power of a SSB and a CSI-RS based on the SINR. For example, the gNB may increase the transmission power of the SSB or the CSI-RS based on the SINR being less than the predefined value.

In step 1050, the gNB can transmit the SSB and the CSI-RS based on the adjusted SSB and CSI-RS transmission power using the selected one or more antenna ports.

Figure 11:
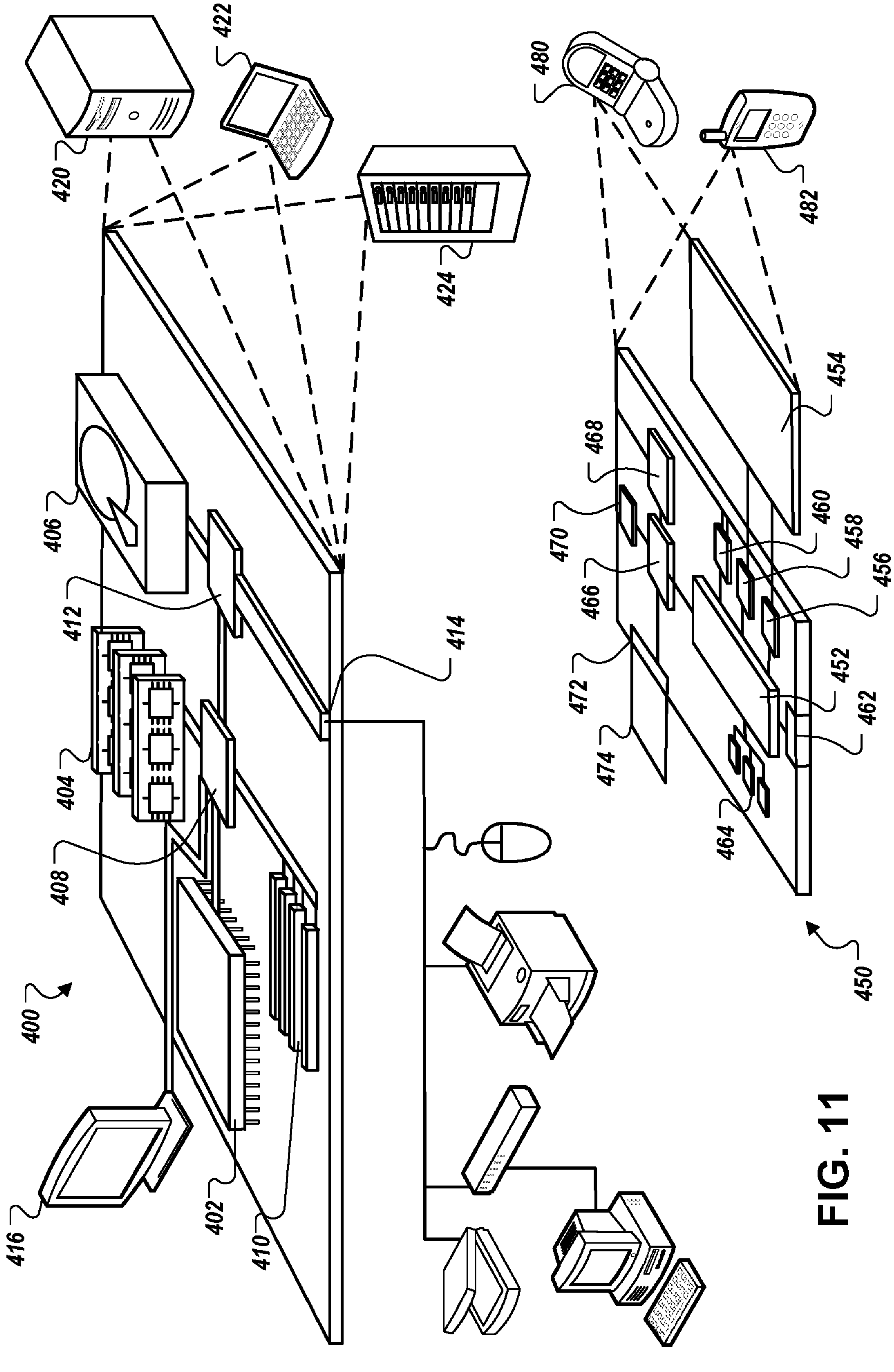
FIG. 11 is a diagram illustrating a computing system that can be used in connection with computer-implemented methods described in this specification.

FIG. 11 shows an example of a computing device 400 and a mobile computing device 450 (also referred to herein as a wireless device) that are employed to execute implementations of the present disclosure. The computing device 400 is intended to represent various forms of digital computers, such as laptops, desktops, workstations, personal digital assistants, servers, blade servers, mainframes, and other appropriate computers. The mobile computing device 450 is intended to represent various forms of mobile devices, such as personal digital assistants, cellular telephones, smartphones, AR devices, and other similar computing devices. The components shown here, their connections and relationships, and their functions, are meant to be examples only, and are not meant to be limiting. The computing device 400 and/or the mobile computing device 450 can form at least a portion of the application installation environment described above.

The computing device 400 includes a processor 402, a memory 404, a storage device 406, a high-speed interface 408, and a low-speed interface 412. In some implementations, the high-speed interface 408 connects to the memory 404 and multiple high-speed expansion ports 410. In some implementations, the low-speed interface 412 connects to a low-speed expansion port 414 and the storage device 406. Each of the processor 402, the memory 404, the storage device 406, the high-speed interface 408, the high-speed expansion ports 410, and the low-speed interface 412, are interconnected using various buses, and may be mounted on a common motherboard or in other manners as appropriate. The processor 402 can process instructions for execution within the computing device 400, including instructions stored in the memory 404 and/or on the storage device 406 to display graphical information for a graphical user interface (GUI) on an external input/output device, such as a display 416 coupled to the high-speed interface 408. In other implementations, multiple processors and/or multiple buses may be used, as appropriate, along with multiple memories and types of memory. In addition, multiple computing devices may be connected, with each device providing portions of the necessary operations (e.g., as a server bank, a group of blade servers, or a multi-processor system).

The memory 404 stores information within the computing device 400. In some implementations, the memory 404 is a volatile memory unit or units. In some implementations, the memory 404 is a non-volatile memory unit or units. The memory 404 may also be another form of a computer-readable medium, such as a magnetic or optical disk.

The storage device 406 is capable of providing mass storage for the computing device 400. In some implementations, the storage device 406 may be or include a computer-readable medium, such as a floppy disk device, a hard disk device, an optical disk device, a tape device, a flash memory, or other similar solid-state memory device, or an array of devices, including devices in a storage area network or other configurations. Instructions can be stored in an information carrier. The instructions, when executed by one or more processing devices, such as processor 402, perform one or more methods, such as those described above. The instructions can also be stored by one or more storage devices, such as computer-readable or machine-readable mediums, such as the memory 404, the storage device 406, or memory on the processor 402.

The high-speed interface 408 manages bandwidth-intensive operations for the computing device 400, while the low-speed interface 412 manages lower bandwidth-intensive operations. Such allocation of functions is an example only. In some implementations, the high-speed interface 408 is coupled to the memory 404, the display 416 (e.g., through a graphics processor or accelerator), and to the high-speed expansion ports 410, which may accept various expansion cards. In the implementation, the low-speed interface 412 is coupled to the storage device 406 and the low-speed expansion port 414. The low-speed expansion port 414, which may include various communication ports (e.g., Universal Serial Bus (USB), Bluetooth, Ethernet, wireless Ethernet) may be coupled to one or more input/output devices. Such input/output devices may include a scanner, a printing device, or a keyboard or mouse. The input/output devices may also be coupled to the low-speed expansion port 414 through a network adapter. Such network input/output devices may include, for example, a switch or router.

The computing device 400 may be implemented in a number of different forms, as shown in the FIG. 11. For example, it may be implemented as a standard server 420, or multiple times in a group of such servers. In addition, it may be implemented in a personal computer such as a laptop computer 422. It may also be implemented as part of a rack server system 424. Alternatively, components from the computing device 400 may be combined with other components in a mobile device, such as a mobile computing device 450. Each of such devices may contain one or more of the computing device 400 and the mobile computing device 450, and an entire system may be made up of multiple computing devices communicating with each other.

The mobile computing device 450 includes a processor 452; a memory 464; an input/output device, such as a display 454; a communication interface 466; and a transceiver 468; among other components. The mobile computing device 450 may also be provided with a storage device, such as a micro-drive or other device, to provide additional storage. Each of the processor 452, the memory 464, the display 454, the communication interface 466, and the transceiver 468, are interconnected using various buses, and several of the components may be mounted on a common motherboard or in other manners as appropriate. In some implementations, the mobile computing device 450 may include a camera device(s) (not shown).

The processor 452 can execute instructions within the mobile computing device 450, including instructions stored in the memory 464. The processor 452 may be implemented as a chipset of chips that include separate and multiple analog and digital processors. For example, the processor 452 may be a Complex Instruction Set Computers (CISC) processor, a Reduced Instruction Set Computer (RISC) processor, or a Minimal Instruction Set Computer (MISC) processor. The processor 452 may provide, for example, for coordination of the other components of the mobile computing device 450, such as control of user interfaces (UIs), applications run by the mobile computing device 450, and/or wireless communication by the mobile computing device 450.

The processor 452 may communicate with a user through a control interface 458 and a display interface 456 coupled to the display 454. The display 454 may be, for example, a Thin-Film-Transistor Liquid Crystal Display (TFT) display, an Organic Light Emitting Diode (OLED) display, or other appropriate display technology. The display interface 456 may include appropriate circuitry for driving the display 454 to present graphical and other information to a user. The control interface 458 may receive commands from a user and convert them for submission to the processor 452. In addition, an external interface 462 may provide communication with the processor 452, so as to enable near area communication of the mobile computing device 450 with other devices. The external interface 462 may provide, for example, for wired communication in some implementations, or for wireless communication in other implementations, and multiple interfaces may also be used.

The memory 464 stores information within the mobile computing device 450. The memory 464 can be implemented as one or more of a computer-readable medium or media, a volatile memory unit or units, or a non-volatile memory unit or units. An expansion memory 474 may also be provided and connected to the mobile computing device 450 through an expansion interface 472, which may include, for example, a Single in Line Memory Module (SIMM) card interface. The expansion memory 474 may provide extra storage space for the mobile computing device 450, or may also store applications or other information for the mobile computing device 450. Specifically, the expansion memory 474 may include instructions to carry out or supplement the processes described above, and may include secure information also. Thus, for example, the expansion memory 474 may be provided as a security module for the mobile computing device 450, and may be programmed with instructions that permit secure use of the mobile computing device 450. In addition, secure applications may be provided via the SIMM cards, along with additional information, such as placing identifying information on the SIMM card in a non-hackable manner.

The memory may include, for example, flash memory and/or non-volatile random access memory (NVRAM), as discussed below. In some implementations, instructions are stored in an information carrier. The instructions, when executed by one or more processing devices, such as processor 452, perform one or more methods, such as those described above. The instructions can also be stored by one or more storage devices, such as one or more computer-readable or machine-readable mediums, such as the memory 464, the expansion memory 474, or memory on the processor 452. In some implementations, the instructions can be received in a propagated signal, such as, over the transceiver 468 or the external interface 462.

The mobile computing device 450 may communicate wirelessly through the communication interface 466, which may include digital signal processing circuitry where necessary. The communication interface 466 may provide for communications under various modes or protocols, such as Global System for Mobile communications (GSM) voice calls, Short Message Service (SMS), Enhanced Messaging Service (EMS), Multimedia Messaging Service (MMS) messaging, code division multiple access (CDMA), time division multiple access (TDMA), Personal Digital Cellular (PDC), Wideband Code Division Multiple Access (WCDMA), CDMA2000, General Packet Radio Service (GPRS). Such communication may occur, for example, through the transceiver 468 using a radio frequency. In addition, short-range communication, such as using a Bluetooth or Wi-Fi, may occur. In addition, a Global Positioning System (GPS) receiver module 470 may provide additional navigation- and location-related wireless data to the mobile computing device 450, which may be used as appropriate by applications running on the mobile computing device 450.

The mobile computing device 450 may also communicate audibly using an audio codec 460, which may receive spoken information from a user and convert it to usable digital information. The audio codec 460 may likewise generate audible sound for a user, such as through a speaker, e.g., in a handset of the mobile computing device 450. Such sound may include sound from voice telephone calls, may include recorded sound (e.g., voice messages, music files, etc.) and may also include sound generated by applications operating on the mobile computing device 450.

The mobile computing device 450 may be implemented in a number of different forms, as shown in FIG. 11. For example, it may be implemented in the mobile device described with respect to FIGS. 1-10. Other implementations may include a phone device 482 and a tablet device 484. The mobile computing device 450 may also be implemented as a component of a smart-phone, personal digital assistant, AR device, or other similar mobile device.

Computing device 400 and/or 450 can also include USB flash drives. The USB flash drives may store operating systems and other applications. The USB flash drives can include input/output components, such as a wireless transmitter or USB connector that may be inserted into a USB port of another computing device.

Although a few implementations have been described in detail above, other modifications may be made without departing from the scope of the inventive concepts described herein, and, accordingly, other implementations are within the scope of the following claims.

What is claimed is:

1. A method for selecting one or more antennas disposed at a base station (BS) of a wireless communication system, the method comprising:

transmitting, to one or more user equipment (UE), one or more initial synchronization signal blocks (SSB) and one or more initial channel state information-reference signals (CSI-RS) using a plurality of antenna ports;

transmitting a demodulation reference signal (DMRS) to the one or more UE, receiving, from the one or more UE, signals including at least one parameter indicative of corresponding operating conditions at the one or more UE in response to (i) the transmitted one or more initial SSB and CSI-RS and (ii) the transmitted DMRS, the at least one parameter including signal to interference and noise ratio (SINR) measurements generated based on the DMRS;

selecting one or more antenna ports among the plurality of antenna ports based on the received at least one parameter;

adjusting transmission power of a SSB and a CSI-RS based on the SINR; and transmitting the SSB and the CSI-RS based on the adjusted SSB and CSI-RS transmission power using the selected one or more antenna ports.

2. The method of claim 1, wherein the DMRS is accompanied by a tracking reference signal (TRS) including a sequence to allow the one or more UE to track time and frequency variations for channel estimation.

3. The method of claim 2, wherein the DMRS and the TRS are transmitted on a same physical resource block.

4. The method of claim 1, wherein the at least one parameter indicates that a logical connection between the UE and the BS is completed, and wherein the one or more antenna ports are selected based on a number of the one or more UEs logically connected to the BS.

5. The method of claim 4, wherein each of the one or more SSBs is transmitted using a single antenna port, wherein the at least one parameter includes a physical random access channel (PRACH) preamble indicating a best SSB for completing the logical connection, and wherein the one or more antenna ports are selected based on the PRACH preamble.

6. The method of claim 1, wherein the at least one parameter includes a CSI-RS resource indicator (CRI) identifying a strongest CSI-RS, and wherein the one or more antenna ports are selected based on the CRI.

7. The method of claim 6, wherein an antenna port that transmitted the strongest CSI-RS indicated by the CRI is selected to perform downlink transmission using the selected one or more antenna ports.

8. A base station (BS) that selects one or more antennas in a wireless communication system, the BS comprising:

memory;

at least one transceiver; and at least one processor, coupled to the memory and the transceiver, the at least one processor configured to:

transmit, to one or more user equipment (UE), one or more initial synchronization signal blocks (SSB) and one or more initial channel state information-reference signals (CSI-RS) using a plurality of antenna ports;

transmit a demodulation reference signal (DMRS) to the one or more UE, receive, from the one or more UE, signals including at least one parameter indicative of corresponding operating conditions at the one or more UE in response to (i) the transmitted one or more initial SSB and CSI-RS and (ii) the transmitted DMRS, the at least one parameter including signal to interference and noise ratio (SINR) measurements generated based on the DMRS;

select one or more antenna ports among the plurality of antenna ports based on the received at least one parameter;

adjust transmission power of a SSB and a CSI-RS based on the SINR; and transmit the SSB and the CSI-RS based on the adjusted SSB and CSI-RS transmission power using the selected one or more antenna ports.

9. The base station of claim 8, wherein the DMRS is accompanied by a tracking reference signal (TRS) including a sequence to allow the one or more UE to track time and frequency variations for channel estimation.

10. The base station of claim 9, wherein the DMRS and the TRS are transmitted on a same physical resource block.

11. The base station of claim 8, wherein the at least one parameter indicates that a logical connection between the UE and the BS is completed, and wherein the one or more antenna ports are selected based on a number of the one or more UEs logically connected to the BS.

12. The base station of claim 11, wherein each of the one or more SSBs is transmitted using a single antenna port, wherein the at least one parameter includes a physical random access channel (PRACH) preamble indicating a best SSB for completing the logical connection, and wherein the one or more antenna ports are selected based on the PRACH preamble.

13. The base station of claim 8, wherein the at least one parameter includes a CSI-RS resource indicator (CRI) identifying a strongest CSI-RS, and wherein the one or more antenna ports are selected based on the CRI.

14. The base station of claim 13, wherein an antenna port that transmitted the strongest CSI-RS indicated by the CRI is selected to perform downlink transmission using the selected one or more antenna ports.

* * * * *